United States Patent [11] 3,620,599

| [72] | Inventor | Arthur Ashkin |
| | | Rumson, N.J. |
| [21] | Appl. No | 837,716 |
| [22] | Filed | June 30, 1969 |
| [45] | Patented | Nov. 16, 1971 |
| [73] | Assignee | Bell Telephone Laboratories, Incorporated |
| | | Murray Hill, Berkeley Heights, N.J. |

[54] NONPOLARIZING WIRE-GRID DIFFRACTION-TYPE OPTICAL ATTENUATOR
6 Claims, 5 Drawing Figs.

| [52] | U.S. Cl. | 350/162, 350/205, 350/275 |
| [51] | Int. Cl. | G02b 5/18, G02b 27/38 |
| [50] | Field of Search | 350/162, 205, 275; 333/81 |

[56] References Cited
UNITED STATES PATENTS

| 2,287,598 | 6/1942 | Brown | 350/162 UX |
| 2,821,109 | 1/1958 | Nicoll | 350/276 UX |
| 3,046,839 | 7/1962 | Bird et al. | 350/162 UX |
| 3,291,871 | 12/1966 | Franics | 350/162 UX |
| 3,413,476 | 11/1968 | Gordon | 350/162 UX |
| 3,474,354 | 10/1969 | Simon | 333/81 X |

*Primary Examiner*—John K. Corbin
*Attorneys*—R. J. Guenther and Arthur J. Torsiglieri ABSTRACT: A continuously variable optical attenuator of the wire-grid type is disclosed in which the wire diameter and the spacings therebetween are from one to three orders of magnitude greater than the wavelength of the optical radiation to be attenuated and which operates upon principles of diffraction. Even at high attenuation factors, the attenuation does not depend significantly upon the polarization of the input optical radiation.

INVENTOR
A. ASHKIN
BY Wilford L. Wisner
ATTORNEY

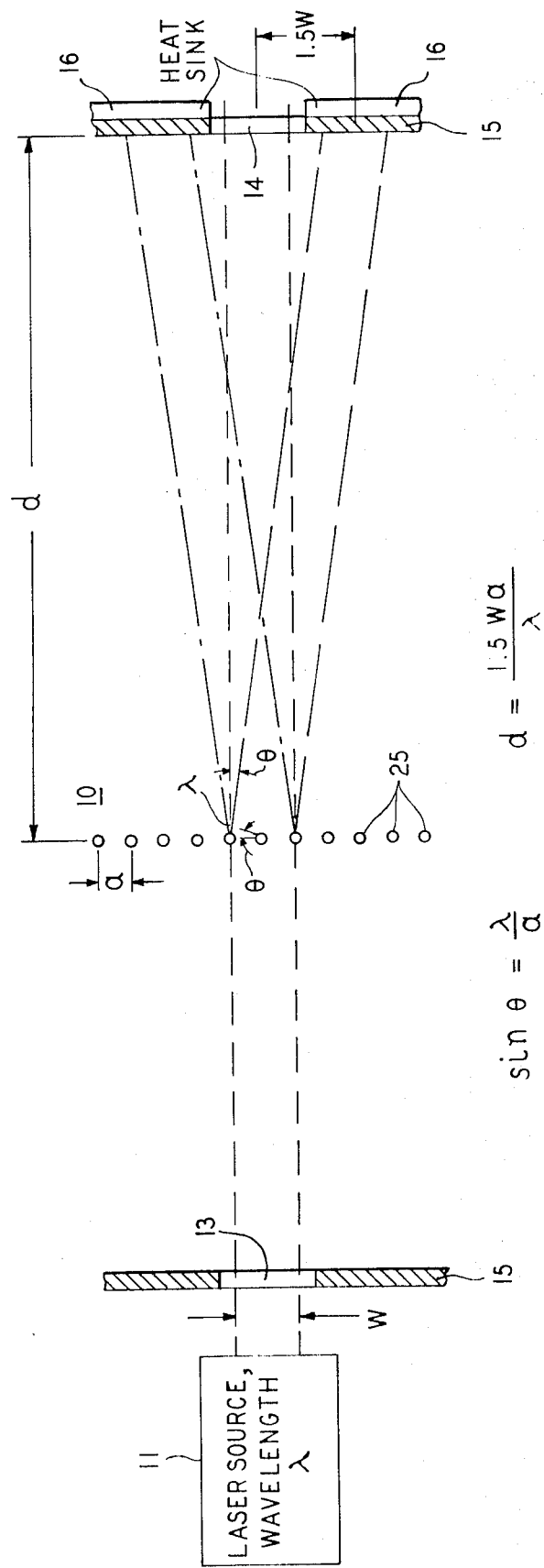

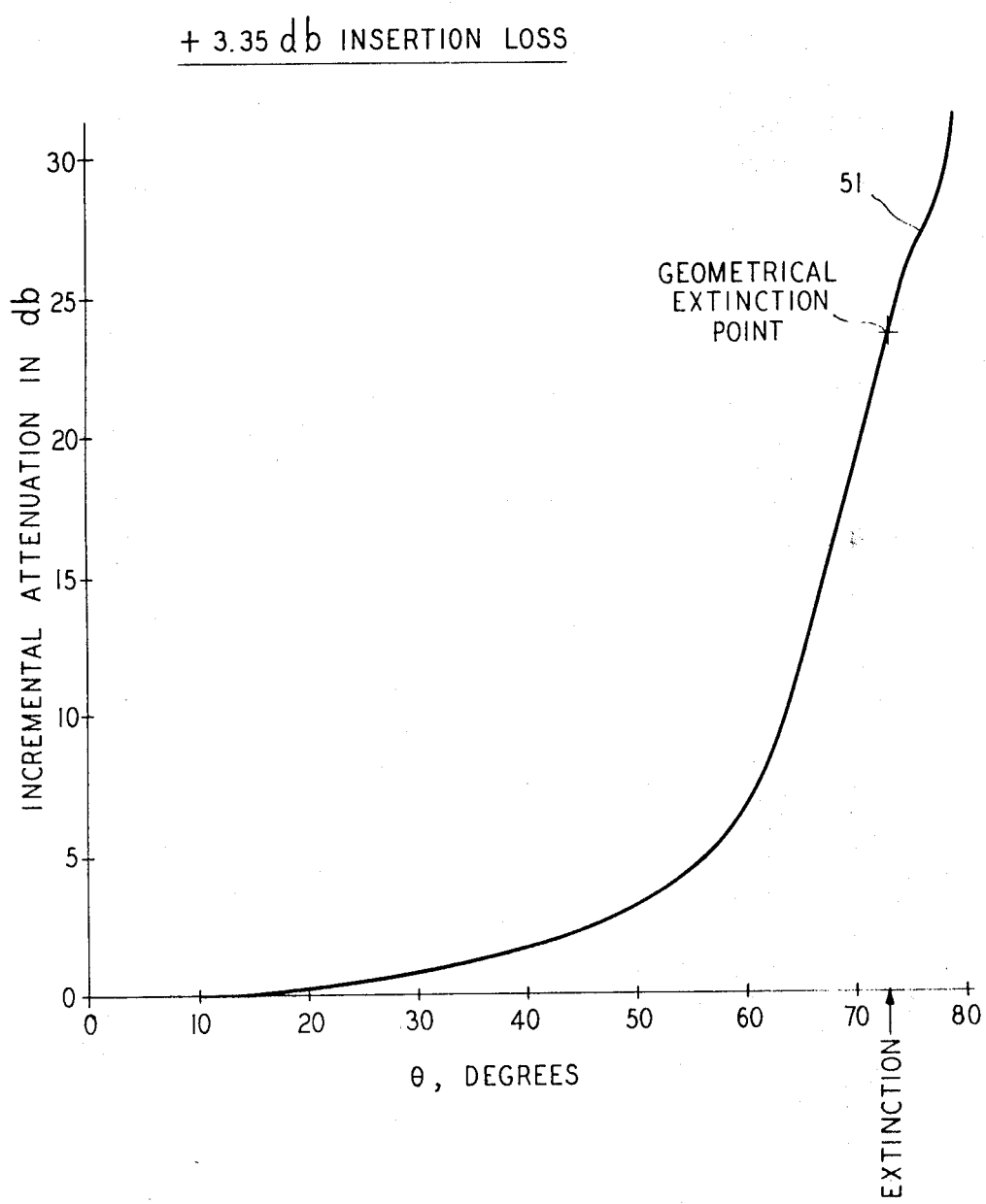

NONPOLARIZING WIRE-GRID DIFFRACTION-TYPE OPTICAL ATTENUATOR

BACKGROUND OF THE INVENTION

This invention relates to optical attenuators of the wire grid type.

With the recent development of high-power continuous wave lasers, many new applications of lasers have been made possible. For example, the properties of materials in the presence of coherent light can be studied. Coherent light has the properties that its wave components at a given frequency are all in phase and that it can be confined to a narrow beam that is collimated and spreads much less than incoherent light under comparable circumstances. These properties are highly advantageous in investigating the properties of materials and in other applications, such as optical communication.

In such uses of coherent light, it is important to be able to vary the intensity of a beam of the coherent light without affecting the quality, shape or direction of the transmitted beam and without affecting the stability of the laser source. To meet these objectives becomes increasingly difficult with increasing laser power levels. In pursuance of these objectives, various types of optical attenuators have been investigated. Thermal defocusing, variable absorption and variable reflection have all been employed.

Among the more stable attenuators have been those employing polarizing wire grids, such as that described in the article by G. R. Bird et al., Journal of the Optical Society of America, Vol. 50, page 886 (Sept., 1960). Nevertheless, such wire grids require extremely fine, closely and uniformly spaced wires and are very difficult and expensive to construct.

Moreover, the polarizing properties of such wire grids are highly inconvenient, since such grids lose their capability of acting as a variable attenuator when the polarization of the input light, or even part of it, is parallel to the wires of the grid. An attenuator capable of handling arbitrary input polarizations would be highly desirable.

Furthermore, fabrication of such grids is not practical in the visible region of the spectrum because of the small elements required; and, even in the infrared, they typically must be supported by a substrate, which has an adverse effect on the operation. For example, at high powers, the residual absorption of even the highest quality optical material employed in the substrate can cause thermal distortion of the material, which, in turn, scatter or defocus the beam. Thus, additional improvement in power-handling capability of attenuators is desirable for use with the high-power continuous wave lasers.

SUMMARY OF THE INVENTION

I have discovered a type of wire grid attenuator that is essentially nonpolarizing at all attenuation levels, is more easily constructed, can handle more power than prior wire grid attenuators, and does not distort and deviate the beam.

A principle feature of my nonpolarizing wire grid attenuator is that its wires have cross-sectional dimensions between approximately one and three orders of magnitude larger than the wavelength of the light to be attenuated and that the spacings therebetween are also approximately between one and three orders of magnitude larger than the wavelength of the light to be attenuated. This attenuator depends, for its operation, upon principles of diffraction, and does not depend on the polarization of the light.

One unexpected result of my discovery is that, as the grid is rotated about an axis parallel to the wires to change the attenuation, the grid does not become polarizing even when the apparent opening for the input light between the wires is reduced to less than a wavelength of the light. Moreover, the grid still provides a smooth variation of attenuation as the apparent opening is reduced to zero, even for light polarized parallel to the grid wires. In fact, it has been discovered that the attenuation is still finite at the geometrical extinction point (where the apparent opening is zero) and that the attenuation remains finite and continues to increase smoothly as the grid is rotated beyond the geometrical extinction point (in which region geometrical projections of the wires would overlap along the line of sight). Of course, sufficient wire surface must still be presented to the beam to intercept the entire cross section of the beam.

My investigations have shown that an attenuator according to my invention yields a transmitted beam of excellent quality, shape and direction.

Other features of my invention reside in various means for increasing the heat dissipation capability of the wire grid and in its inclusion in a tandem-apertured light-absorbing enclosure to remove the diffracted and reflected portions of the input light beam.

BRIEF DESCRIPTION OF THE DRAWING

A more complete understanding of the construction and operation of an optical attenuator according to my invention may be obtained from the following detailed description, taken together with the drawing, in which:

FIG. 4 is a partially cutaway view of the embodiment of FIG. 1 in which the input and output light beams and first order diffracted light beams are shown in relation to the apertures of the enclosure; and FIG. 5 shows an experimentally determined attenuation-versus-rotation curve.

DESCRIPTION OF ILLUSTRATIVE EMBODIMENT

Figure 1:
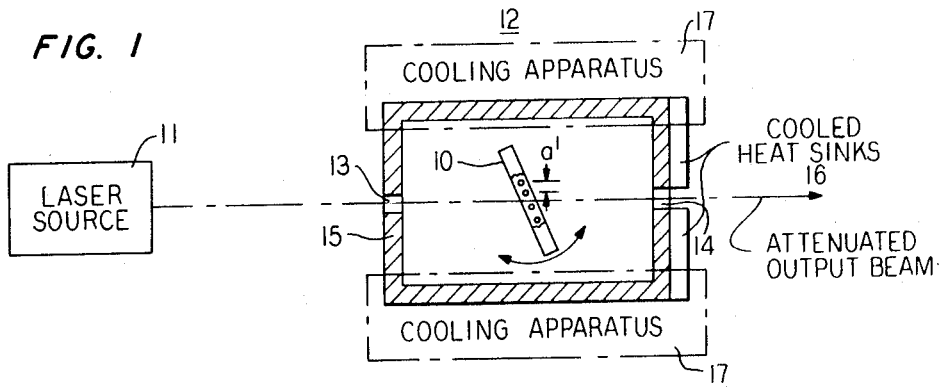
FIG. 1 is a partially pictorial and partially block diagrammatic illustration of a preferred embodiment of my invention.

In the embodiment of FIG. 1, it is desired to variably attenuate the coherent beam of light from a high-power, continuous wave laser source 11 in order to control the intensity of the output beam indicated at the right of FIG. 1. Illustrative examples of a high-power laser source 11 for which this is desirable may be either a carbon dioxide laser operating at 10.6 micrometers, neodymium-ion solid state laser operating at 1.06 micrometers, or a high-power, continuous wave argon ion laser operating in the visible at 0.5145 micrometers.

To this end, a wire grid attenuator 12 according to my invention is disposed in the path of the coherent light beam from source 11 with its apertures 13 and 14 aligned along the path of the beam. Attenuator 12 includes a nonpolarizing wire grid 10 rotatably mounted within a light-absorbing enclosure 15 in which the input aperture 13 and the output aperture 14 are axially aligned with the center of grid 10. Grid 10 is mounted for rotation about an axis parallel to the wires and orthogonal to the plane of the paper. The rotation axis passes through and is orthogonal to the center line of the apertures 13 and 14. Since the grid 10 is shown in partial section, the rotatable mounting posts are not readily shown but may be more easily seen in FIGS. 2 or 3.

The attenuator 12 also includes the cooled heat sinks 16 which are illustratively copper or silver blocks mounted on the output face of enclosure 15 about aperture 14 in close thermal coupling to the portion of enclosure 15 upon which the first-order diffracted beams impinge. The way in which the first-order, as well as higher order, diffracted beams are blocked from the output will be more apparent from the discussion of FIG. 4. The cooled heat sinks 16 are extended to the edges of the enclosure 15 so that they may be readily cooled by cooling apparatus 17, which may be conventional refrigeration apparatus. The cooling apparatus (or apparatuses) 17 is disposed about the sidewalls of enclosure 15 so that it also tends to maintain the sidewalls cool. The cooling function provided by apparatus 17 is a substantial aid to the overall power-handling capabilities of attenuator 12.

Figure 2:
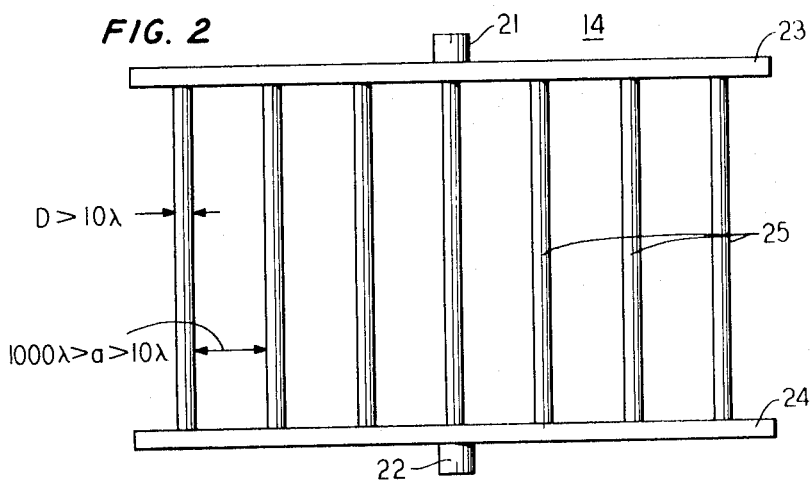
FIG. 2 is an elevation of the grid alone as viewed normal to the plane of the grid.

The nonpolarizing characteristics of attenuator 12 reside primarily in the proportioning of the wire elements of wire grid 10, which may be more exactly explained with reference to the elevation of FIG. 2. In FIG. 2 the wire grid 10 includes the rotatable mounting posts 21 and 22, the top plate 23, the bottom plate 24, and the individual wire grid elements 25 of identical size and spacing. The top plate 23 and the bottom plate 24 are electroplated metal plates of a conventional composition suitable for brazing of the wire grid elements 25 thereto.

The grid elements 25 are illustratively of tungsten coated with evaporated aluminum or silver, of round cross section and polished, or overcoated with a dielectric layer, to a high degree of reflectivity, although the latter property is not essential. The diameter $D$ of each element 25 is greater than 10 wavelengths $\lambda$ of the light to be attenuated, and is preferably less than 1,000 $\lambda$. Likewise, the spacing, or orthogonal distance $a$, between the wire grid elements 25 is greater than 10 $\lambda$ and preferably less than 1,000 $\lambda$. More specifically, in order to provide an adequate range of linear attenuation, the distance $a$ is generally preferred to be at least as great as 20 $\lambda$.

With grid elements 25 of such cross-sectional dimensions and preferably of substantial reflectivity, it is apparent that whatever heat is absorbed by the grid elements 25 may be readily dissipated by thermal conduction therethrough, thence through the top and bottom plates 23 and 24, the mounting posts 21 and 22, and the enclosure 15 to cooling apparatus 17. A substantial portion of the heat absorbed in grid elements 25 will be radiated directly therefrom to enclosure 15 by blackbody radiation, since enclosure 15 is maintained at a lower temperature than the wire grid elements 25.

Figure 3:
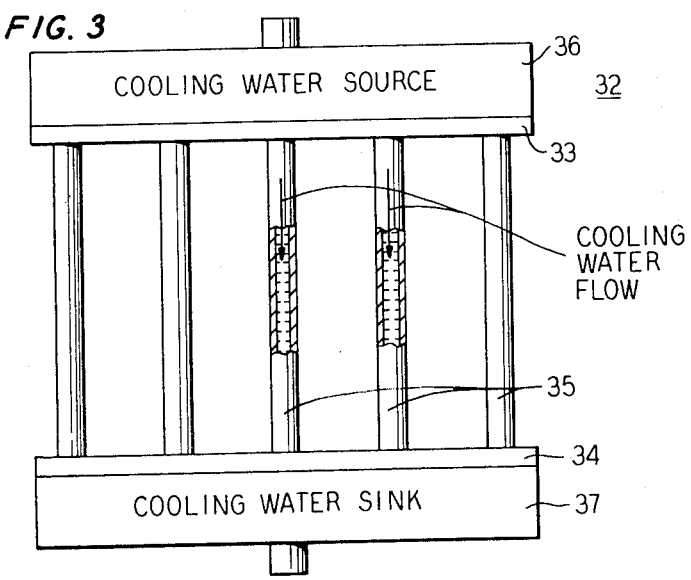
FIG. 3 is an elevation of a water-cooled grid according to my invention.

Before proceeding to describe the operation of the embodiment of FIG. 1, one significant structural variation of the wire grid 14 therein will be described. This variation is shown in FIG. 3 as a wire grid 32 including hollow elements 35 and the cooling water source 36 disposed above top plate 33 and coupled to the hollow elements 35. A cooling water sink 37 is attached to the bottom side of bottom plate 34 and coupled to hollow elements 35, and may be drained by means not shown. Similarly, the cooling water source 36 may be supplemented or continuously supplied from a water source or reservoir, not shown. The cooling water source 36 is coupled to the hollow grid elements 35 by appropriate apertures in top plate 33 which enable water flow therethrough. The cooling water sink 37 is coupled to the hollow grid elements 35 by appropriate apertures through bottom plate 34 which enable water flow therethrough.

It may be seen, particularly at a wavelength of 10.6 micrometers in the infrared, that the dimensions of the grid elements 35 are sufficiently large that they may be readily fabricated as hollow elements made of bronze, copper, silver or other highly heat conductive material. This adaptation of the grid 32 yields a power-handling capability of many times that of grid 10 of FIG. 1.

The experimental operation of the embodiment of FIG. 1 will now be described for one specific solid wire grid with reference to FIG. 4 and to FIG. 5, in which the experimental results are shown. The specific wire grid 10, shown in section in FIG. 4 and used in my experiment, employed aluminum-coated tungsten wires and had an element diameter $D$ of three-tenths of a mil (7.5 micrometers) and a spacing $a$ therebetween of seven-tenths of a mil (17.8 micrometers). The laser source 11 was an argon ion laser operating at 0.5145 micrometers at power levels of about 1.5 watts. It will be noted that $D$ was about 15 times the optical wavelength; and the spacing $a$ was about 35 times the optical wavelength. This laser was a relatively high-power laser of the type for which my invention is most advantageous; and it produces a narrow line of high spectral purity, coherence and stability, as is desirable for the purposes of such experiments. The beam diameter $w$ was about 2 millimeters and the size of apertures 13 and 14 was sufficiently larger than $w$ to allow for normal spreading of the unattenuated beam in passage through the attenuator. In practice I found that an aperture size of about 1.1 $w$ was adequate for a beam of the above-described width. A more highly focused beam requires relatively larger apertures to pass all of the zero-order beam.

When the laser light strikes the elements 25 of grid 10 and illustratively intercepts several grid elements, even at normal incidence, each spacing will act as an aperture for the portion of the light passing therethrough. Each such aperture will cause some of the light energy to be diffracted from the main, or zero-order, beam. The first order diffraction beam will be diffracted at a very small angle $\theta$, the sine of which is the ratio of the wavelength $\lambda$ to the spacing $a$. Each diffracted beam will have approximately the width $w$; and it will be apparent that, at an adequately large distance $d$, the first-order, as well as higher order, diffracted beams are completely separated from the main beam so that they may be intercepted by the enclosure 15 adjacent the sides of aperture 14 and thereby blocked from the output. Of course, the higher order diffracted beams (not shown) are diffracted at a larger angle than the first-order diffracted beams and are thus clearly blocked from the output.

Some simple trigonometry will show that the length $d$ must be at least approximately $1.5\,w\cdot a/\lambda$ if the centers of the main beam and the first-order diffracted beams are to be separated by about 1.5 $w$. While smaller separations of the beams are possible, $d$ must always be greater than $w\cdot a/\lambda$.

For successful operation of my attenuator, it is important that the minimum spacing $d$, as above described, be provided between the grid 10 and the output aperture 14. The diffracted beams are then absorbed and the heat carried away by enclosure 15, heat sinks 16 and cooling apparatus 17.

Note the grid causes shadows immediately behind itself; but these shadows disappear in the far field where the different diffraction orders are completely spatially separated. Therefore, the original beam shape is reconstituted in each of the separated orders, e.g., at the distance of the output aperture.

Advantageously, as the wire grid 10 is rotated away from normal incidence of the input beam thereon in order to increase the attenuation, the first-order diffracted beams are diffracted at increased angles $\theta$. Accordingly once the attenuator has been properly adjusted for normal incidence of the light upon wire grid 10, the diffracted light will always be intercepted and removed from the output by enclosure 15.

The zero-order beam experiences no net phase differences among portions passing through adjacent apertures and therefore proceeds in the same direction as the original beam, even with the grid at an angle. This feature is very important in matching into resonators and in interferometry. It is also significant that the transmitted beam sees no dielectric except air and is substantially free from distortions.

It is apparent that the attenuation increases as the grid 10 rotates so that the apparent spacing $a'$ between elements 25 as viewed from source 11 becomes less. What is not obvious about the higher levels of attenuation and yet surprisingly has been achieved, is that even when $a'$, the apparent spacing, approaches and passes the geometrical extinction point, the grid 10 does not become polarizing. In other words, it still exhibits a smooth variation of attenuation for any arbitrary polarization of the light from source 11.

In more detail, my experiments with the above-described specific grid and the argon ion laser show a variation of fractional attenuation with the angle $\Phi$ of rotation of grid 10 away from normal incidence as shown in FIG. 5. This data is shown as incremental attenuation in db. versus rotation angle in degrees in curve 51 of FIG. 5. To the incremental attenuation must be added 3.5 db. insertion loss.

Note that the geometrical extinction point is marked, and corresponds to an attenuation which is less than the maximum attenuation that was actually achieved. Geometrical extinction occurred at a rotation angle of about 72°. The upper portion of curve 51 beyond this point represents operation beyond the condition of geometrical extinction. Note that the variation is continuous and smooth.

Other successful experiments have been performed with a similar grid to attenuate 0.6328 micrometer radiation of an He-Ne laser.

To double the range of attenuation two such grids can be used in tandem between the apertures 13 and 14 and will act independently without moire interference if they are oriented for rotation about orthogonal axes, each grid having wires parallel to its own rotation axis.

In addition, a single rectangular mesh-type grid will yield a larger absolute attenuation at a given angle, but will not yield a significantly larger range than the comparable parallel wire grid.

I claim:

1. An optical attenuator of the type employing a grid of parallel reflective wires and being mounted for rotation about an axis parallel to said wires, characterized in that said wires have cross-sectional dimensions between one and three orders of magnitude larger than the wavelength of the optical radiation to be attenuated and have spacings therebetween which are between one and three orders of magnitude larger than the wavelength of the radiation, and including means in tandem with said grid in said attenuator for selectively transmitting only a beam of a single diffraction order and for blocking beams of all other diffraction orders from transmission through said attenuator.

2. An optical attenuator of the type described in claim 1 in which the transmitting means includes an optically absorbing enclosure surrounding the grid of attenuator wires and having an input aperture and an output aperture aligned along an axis intersecting the axis rotation of the grid, said grid being separated from said output aperture by a distance at least as large as the beam width times the actual spacing of the wires divided by the wavelength of the radiation to be attenuated, whereby the first order and higher order diffracted beams will be blocked from the output aperture.

3. An optical attenuator of the type claimed in claim 2 including means for cooling the enclosure to a temperature below the temperature of the grid.

4. An optical attenuator of the type claimed in claim 1 in which the wires are hollow and including means for flowing a coolant through said wires.

5. An optical attenuator of the type claimed in claim 1 in which the wires have circular cross sections of diameter between 10 and 1,000 times the wavelength of the optical radiation to be attenuated and the orthogonal distance between the wires is between 20 and 1,000 times the wavelength of the optical radiation to be attenuated.

6. An optical attenuator of the type claimed in claim 5 in which the wires have cross sections of diameter about 15 times the wavelength of the optical radiation to be attenuated and the orthogonal distance between the wires is about 35 times the wavelength of the optical radiation to be attenuated.

* * * * *